United States Patent
Borla

(10) Patent No.: US 6,433,730 B1
(45) Date of Patent: Aug. 13, 2002

(54) NOISE RIDING THRESHOLD CONTROL WITH IMMUNITY TO SIGNALS WITH HIGH PULSE REPETITION FREQUENCIES AND HIGH DUTY CYCLES

(75) Inventor: John D. Borla, Newington, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/867,700

(22) Filed: Jun. 7, 2001

(51) Int. Cl.$^7$ .............................................. G01S 7/285
(52) U.S. Cl. ............................ 342/91; 342/93; 342/99; 342/197
(58) Field of Search .............................. 342/13, 89, 91, 342/92, 93, 94, 99, 159, 162, 192, 195, 196, 197

(56) References Cited

U.S. PATENT DOCUMENTS

| | | | |
|---|---|---|---|
| 3,603,996 A | * 9/1971 | Murchison et al. | 342/28 |
| 3,838,422 A | * 9/1974 | MacArthur et al. | 342/93 |
| 3,946,382 A | * 3/1976 | Kossiakoff et al. | 342/93 |
| 4,001,826 A | * 1/1977 | Moulton | 342/110 |
| 4,051,473 A | * 9/1977 | Hooker, Jr. | 342/93 |
| 4,062,012 A | * 12/1977 | Colbert et al. | 342/90 |
| 4,122,448 A | * 10/1978 | Martin | 342/174 |
| 4,642,641 A | * 2/1987 | Campbell | 342/88 |
| 5,708,437 A | * 1/1998 | Gellekink | 342/91 |

OTHER PUBLICATIONS

"Maximizing noise–limited detection performance in medium PFR radars by optimizing PFR visibility", Moorman, R.A.; Westerkamp, J.J., Aerospace and Electronics Conference, 1993. NAECON 1993, Proceedings of the IEEE 1993 National, 199 pp. 288–293 vol.*

"Track–before–detect performance for a high PRF search mode", Harmon, J.L., Radar Conference, 1991., Proceedings of the 1991 IEEE National, 1991, pp. 11–15.*

"Cascaded detector for multiple high–PRF pulse Doppler radars", Gerlach, K.; Andrews, G.A., Aerospace and Electronic Systems, IEEE Transactions on, vol. 26, Issue: 5, Sep. 1990, pp. 754–767.*

* cited by examiner

Primary Examiner—John B. Sotomayor
(74) Attorney, Agent, or Firm—Michael J. McGowan; Prithvi C. Lall; Michael F. Oglo

(57) ABSTRACT

A system and method is disclosed for a radar receiver, such as a wideband crystal video early warning receiver, to automatically detect the noise level of the radar receiver with immunity to high pulse repetition frequencies and high duty cycle signals. The noise riding threshold circuit utilizes high frequency components of the noise and, to the attenuated extent present, high frequency components of the video signal to produce the noise riding threshold voltage. An amplifier gain control permits adjusting the noise-riding threshold to a fixed relative level. In a preferred embodiment, the noise riding threshold control of the present invention utilizes current feedback amplifiers for wide bandwidth, high gain video amplifiers.

18 Claims, 1 Drawing Sheet

NOISE RIDING THRESHOLD CONTROL WITH IMMUNITY TO SIGNALS WITH HIGH PULSE REPETITION FREQUENCIES AND HIGH DUTY CYCLES

CROSS-REFERENCE TO RELATED PATENT APPLICATIONS

There are no related patent applications.

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to detection of radar signals and, more specifically, to apparatus and methods for detecting radar signals with high pulse repetition frequency and high duty cycles.

(2) Description of the Prior Art

While radar uses different pulse repetition frequencies and duty cycles, in some cases it is desirable that the pulse repetition frequency and/or duty cycle be relatively high. For instance, high pulse repetition frequencies may be used for those situations when the radar is detecting relatively close but fast moving objects, with respect to the transmitter, to thereby provide more up to date information about those objects and/or the relative movement therebetween. The closer proximity of the object from which radar reflections occur readily allows use of a higher pulse repetition frequency because the reflection return time of the transmitted pulses is shorter.

Noise riding threshold controls are presently used in wideband crystal video early warning receivers to automatically detect the noise level of the radar receiver and to automatically set and control a signal detection threshold above the noise level. However, the existing noise riding threshold control designs are not immune to signals with high pulse repetition frequencies and/or high duty cycles. When a high pulse repetition frequency, high duty cycle signal is received, prior art noise riding threshold controls may detect the signal as noise and raise the signal detection threshold by some amount related to the signal's pulse repetition frequency, duty cycle, and detected power. Thus, one problem with prior art noise riding threshold controls is that the signal to be detected contains components that are considered to be noise by the noise riding threshold circuit, which therefore sets too high a threshold with respect to the actual noise components.

The following patents disclose various radar receivers and components thereof.

U.S. Pat. No. 3,805,267, issued Apr. 16, 1974, to Collot Gerard, discloses an aircraft radar receiver for searching and for tracking a target through one or more telemetry windows. In the search phase, the receiver carries out distance scanning and, on receiving a target echo, locks onto the same in order to supply telemetric information. The receiver comprises means for, during the search phase, desensitizing the radar receiver for the distance, which corresponds to the altitude of the aircraft above the ground so that the altitude return signal does not cause the radar to switch to tracking state. The desensitization means are inoperative when the altitude return signal occurs in the radar tracking state.

U.S. Pat. No. 3,825,930, issued Jul. 23, 1974, to Eric Davies, discloses that in order to reduce the effect of jamming pulses or spurious noise on the operation of a radar, incoming signals are attenuated to below a threshold level. Only those pulses, which on integration over a number of pulse repetition periods exceed the threshold level, are utilized. Additional information concerning a radar target is obtained from the degree of alternation to which each incoming signal is subjected in order to bring it below the threshold level.

U.S. Pat. No. 4,542,382, issued Sep. 17, 1985, to Will A. Hol, discloses a search radar apparatus containing an MTI video processing unit provided with a canceler for generating video signals of moving targets; a zero-velocity filter for generating clutter video signals; a conditional circuit connected to the canceler and the filter for generating, per range quant of each radar scan, a clutter switching signal, if, for the range quant, the signal value obtained with the filter is greater than the signal value obtained with the canceler; a combination circuit connected to said filter and the conditional circuit for selecting the clutter video signals present with the clutter switching signals and for determining therefrom a temporary clutter level in each clutter cell and each antenna revolution period; and clutter level indication means connected to the combination circuit for determining a standard clutter level per range-azimuth clutter cell of the radar range with the application of clutter video signals.

U.S. Pat. No. 4,700,191, issued Oct. 13, 1987, to Dan Manor, discloses a radar warning receiver for detecting and analyzing radar signals which comprises a plurality of RF heads each tuned to a predetermined frequency band and connected to an antenna covering a preselected sector of reception of radar signals. Each of the heads includes a frequency converter converting the received signals to a common frequency based-band and producing an output signal in the base-band corresponding to the signal received by its antenna. The radar receiver also includes a central receiver unit receiving the signals from the RF heads, the central receiver unit comprising a plurality of channels, one for each RF head, for receiving and processing the signals from the respective head; and mode selector means for selectively switching the central receiver unit to operate according to: (a) an Acquisition Mode, wherein the plurality of channels are connected to cover contiguous sub-bands of the base-band; or (b) an Analysis Mode, wherein the plurality of channels are connected in parallel to cover the same sub-band of the base-band.

U.S. Pat. No. 4,806,933, issued Feb. 21, 1989, to Halsey and Gasser, discloses a crystal video receiver having CW and pulse detection capability which includes a threshold signal generator which switchably provides fixed and noise riding threshold signals, used to determine initial signal detection. Track and hold circuits provide a second threshold, derived from the peak received signal level, for establishing the termination of received video pulses. A pulse width counter is coupled to determine the time a received pulse signal is between the two thresholds and is set to overflow at a predetermined time after the reception of a signal to establish a pulse representative of a received Cw signal and to prevent receiver lock up.

U.S. Pat. No. 5,280,289, issued Jan. 18, 1994, to George R. Root, discloses an automatic thresholding target detection system operable in high clutter, noisy environments providing target recognition through the generation of automatic signal thresholds. Infrared and radar detectors scanning an environment detect radiant energy from manmade and natural sources. The energy received is converted to electrical signals representative of the varying energy intensities, which are filtered and compared with a computed target signal threshold. Signal spikes having amplitudes greater than the automatically generated threshold are then evaluated using a shape parameter test. Finally, an automatic region clutter recognition processor confirms that the spike is a true target, clutter or noise.

U.S. Pat. No. 5,451,956, issued Sep. 19, 1995, to Donald L. Lochhead, discloses a method and apparatus for processing the log video output of a receiver that can measure multiple time overlapped pulses on a nearly instantaneous basis. The receiver measures frequency, pulse modulation, time of arrival, amplitude, pulse width and phase difference when simultaneous pulses are present. To detect pulse parameters a given voltage threshold must be exceeded and M out of the last N data samples must fall within a given voltage window that is above the threshold voltage. Pulse detection is initiated by establishing a dynamic noise threshold that is above the random noise level. When a pulse arrives, the value of the amplitude samples is measured and when the successive differences between the amplitude samples are small enough then a pulse presence is declared. Following detection of a pulse, amplitude samples are continuously taken and processed to detect the end of the pulse or a pulse-on-pulse condition. A pulse-on-pulse condition is detected when the difference between successive amplitude samples again starts to increase after initially stabilizing. As soon as M out of the last N amplitude samples fall within a predetermined voltage window then the second pulse has stabilized. On the trailing edge of the second pulse, the successive differences between amplitude samples become comparatively large and fall outside of the predetermined amplitude window indicating termination of the second pulse. By using this method, the receiver can determine when the leading edge of a pulse occurs, when the pulse is stable, when an additional pulse is encountered and when the pulse terminates.

U.S. Pat. No. 5,465,095, issued Nov. 7, 1995, to Steve M. Bryant, discloses a time efficient method for processing digitized Doppler radar signals and establishes adaptive target detection thresholds, which are used to distinguish targets from noise and clutter. After subdividing the range-doppler matrix into several equally sized parallel processing elements, the radar system's signal processor executes this process on each processing element in parallel. This process involves the processing of the digitized radar signals stored in each parallel processing element by integrating over the amplitudes of each data cell in a given parallel processing element. This, in turn, yields a secondary data array for each parallel processing element equal in dimension to the parallel processing element itself. Target detection thresholds for all cells in each parallel processing element can then be established from the values stored in these secondary data arrays. This process is time efficient in that the number of signal processing steps needed to establish the target detection thresholds for each and every data cell in the range-doppler matrix is independent of the number of targets and unique noise, clutter regions in the surveillance area.

U.S. Pat. No. 5,337,054, issued Aug. 9, 1994, to Ross and Mara, discloses that a four-terminal network in tandem with a tunnel diode (TD) threshold receiver currently used in radar or communications improves its sensitivity. Previous inventors have shown that the temperature and sensitivity properties of a conventional TD threshold device used for detecting very short duration bursts of microwave energy would be enhanced by appropriately biasing the TD by a current derived from the thermal noise; the current sets the TD operating point. The magnitude of the current is determined by a constant false alarm rate (CFAR) feedback loop. The subject invention recognizes that a TD changes states (i.e., a detection event) when the area under the current vs. time curve or the charge passing through the device exceeds a prescribed number of picocoulombs. To maximize the charge and improve detection, a form of superheterodyne conversion is introduced to convert the oscillatory short pulse microwave signal received by an antenna to a monopolar baseband signal. This is done by mixing the incoming signals with a CW carrier whose frequency is precisely chosen so that the resulting beat frequency is one-half of an rf cycle for the given duration of the microwave burst. This maximizes the charge available to trigger the TD. Proper gain and filtering is provided in the adjunct four-terminal network to establish minimum noise figure and appropriate gain to drive the TD held in a CFAR loop. It is shown both mathematically and experimentally that the subject invention can increase the receiver sensitivity by a factor of 20 dB or greater over the prior art. Proper microwave gain is provided to establish the noise figure prior to mixing in the added four-terminal network and a bandpass filter is employed to discard frequency components and the gain of a wideband IF (e.g., 0–500 MHz) is selected to appropriately drive the TD.

U.S. Pat. No. 5,357,256, issued Oct. 18, 1994, to Salvador J. Peperone, discloses a method of detecting a target signal at a target signal level below the level of clutter in the return signals of a radar receiver. The receiver i.f. signals are correlated by multiplying delayed i.f. signals with undelayed i.f. signals. The correlated signals are filtered and then decomposed into their spectral component frequencies. The spectral components are compared, in turn, with individual thresholds. The individual thresholds are formed by summing the weighted values of selected ones of the spectral components, the selection being such that the spectral component being compared with a threshold is not used in forming that threshold. A target output signal is generated whenever any one of the spectral components exceeds the level of the threshold against which it is compared. In a second embodiment, in-phase and quadrature correlator signals are formed by the use of two correlators and two delay lines having different delay times that provide a 90 degree phase difference. The complex correlated signals are filtered, decomposed into spectral component frequencies and processed as in the first embodiment to generate a target output signal. In both embodiments, decomposition of the correlated signals may be carried out by means of a Discrete Fourier Transform.

U.S. Pat. No. 5,361,069, issued Nov. 1, 1994 (disclaimed to Nov. 1, 2008), to Klimek et al, discloses an airborne radar warning receiver for track-while-scan radar including a first radar frequency receiver and logic circuitry for determining an increase in pulse rate frequency, second radar frequency receiver connected to a signal filter and an automatic gain control amplifier connected to the receiver and a logic circuitry connected to the amplifier and to the pulse rate frequency logic whereby the ratio is determined between the time from the start of scan until the radar beam illuminates the aircraft and the total scan time, thereby indicating the center of a search scan sector. A third radar frequency receiver connected to a signal filter and a logic circuitry connected to the receiver for indicating when signals are being radiated indicative of the launching of a radar controlled missile.

U.S. Pat. No. 5,450,089, issued Sep. 12, 1995, to Hui and Okida, discloses a monopulse thresholding processor and method for improving resolution by using the difference channel data to eliminate excess sum channel returns. The processor may be used with a radar system that comprises an antenna, a transmitter, a receiver for processing transmitted radar signals to produce radar returns therefrom, a log compressor for converting radar returns to log values, and a display for displaying the radar returns. The signal processor comprises a left sum and right sum generator coupled to the receiver for computing a left sum and a right sum from radar returns generated by the receiver. A pseudo-difference generator is coupled to the left sum and right sum generator for generating pseudo-difference channel data. A beam sharpener is coupled to the left sum and right sum generator and to the pseudo-difference generator for beam sharpening the radar returns. A minimums generator is coupled between the left sum and right sum generator and the beam sharpener for processing outputs from the left sum and right sum generator, for comparing them to a threshold value, and for providing an output signal comprising a minimum of the processed radar returns. The Hui and Okida invention generates a pseudo-difference channel using sum channel dam, thereby reducing hardware and software, and uses the difference channel as a threshold for keeping the sum channel returns. The sum channel returns are not modified by the difference channel returns if the threshold is exceeded. Therefore, side lobes resulting from intermixing of the sum and difference channel returns are not possible, thereby eliminating generation of false targets. Also, because sum channel returns that exceed the threshold are not modified, these signals remain at their original strength. The device uses the pseudo difference channel data as a threshold on the sum channel data to perform beam sharpening that sharpens discrete target and clutter edges.

In summary, while the prior art shows various noise riding threshold controls for use in receiving radar signals, the above disclosed prior art does not show a receiver having a noise riding threshold control that provides immunity to high pulse rate repetition and high duty cycle-while still providing a threshold based on signal noise. Consequently, there remains a need for a radar receiver that provides an improved noise riding threshold detector. Those skilled in the art will appreciate the present invention that addresses the above and other problems.

SUMMARY OF THE INVENTION

Accordingly, it is an object of the present invention to provide an improved early warning radar receiver. It is another object of the present invention to provide a noise riding threshold method and control with immunity to high pulse repetition frequencies and high duty cycles.

It is yet another object of the present invention to provide a crystal video receiver that maintains a high degree of signal sensitivity in an environment that contains radar emitters with high duty cycles and/or high pulse repetition frequencies.

These and other objects, features, and advantages of the present invention will become apparent from the drawings, the descriptions given herein, and the appended claims.

In accordance with the present invention, a method and apparatus is disclosed for a radar receiver, which comprises a detector for receiving a radar signal. The detector strips out the carrier signal to produce a video signal that contains noise. Preferably, one or more amplifiers are provided to amplify the video signal with the noise to produce an amplified signal. A noise riding threshold control receives the amplified signal. The noise riding threshold control has a high pass filter with a low frequency cutoff greater than 500 KHz. The noise riding threshold circuit is operative to produce a dc threshold signal. A comparator receives the amplified signal and the dc threshold signal.

In a preferred embodiment, the noise riding threshold control comprises one or more current feedback video amplifiers. The noise riding threshold control may further comprise a first video amplifier with a gain control. A second video amplifier with rectifiers may be used for producing a rectified signal. A low pass filter with a high frequency cutoff less than 10 Hz integrates the rectified signal to produce the dc threshold signal. Preferably, the high pass filter is disposed between the first video amplifier and the second video amplifier. In a preferred embodiment, the first current feedback amplifier for receiving the amplified signal utilizes a potentiometer for adjusting a gain thereof.

In operation, the radar signal is envelope detected to remove the carrier signal and to produce a combination signal having a video signal combined with a noise signal. The video signal has high frequency video signal components above 500 KHz and low frequency video signal components below 500 KHz. The noise signal has high frequency noise components above 500 KHz and low frequency noise components below 500 KHz. The combined signal is split into two paths with the first path being connected directly to a comparator. The combined signal is filtered to obtain the high frequency video signal components above 500 KHz and the high frequency noise components above 500 KHz. The relevant video signal above 500 KHz is greatly reduced as compared to the noise component above 500 KHz so that practically all the signal at these frequencies is noise. The high frequency video signal components above 500 KHz and the high frequency noise components above 500 KHz are rectified and integrated to produce the noise riding threshold signal. The noise riding threshold signal and the combination signal of video and noise are compared in the comparator to produce an output signal when the video signal is greater than the threshold signal.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

BRIEF DESCRIPTION OF THE PREFERRED EMBODIMENTS

Figure 1:
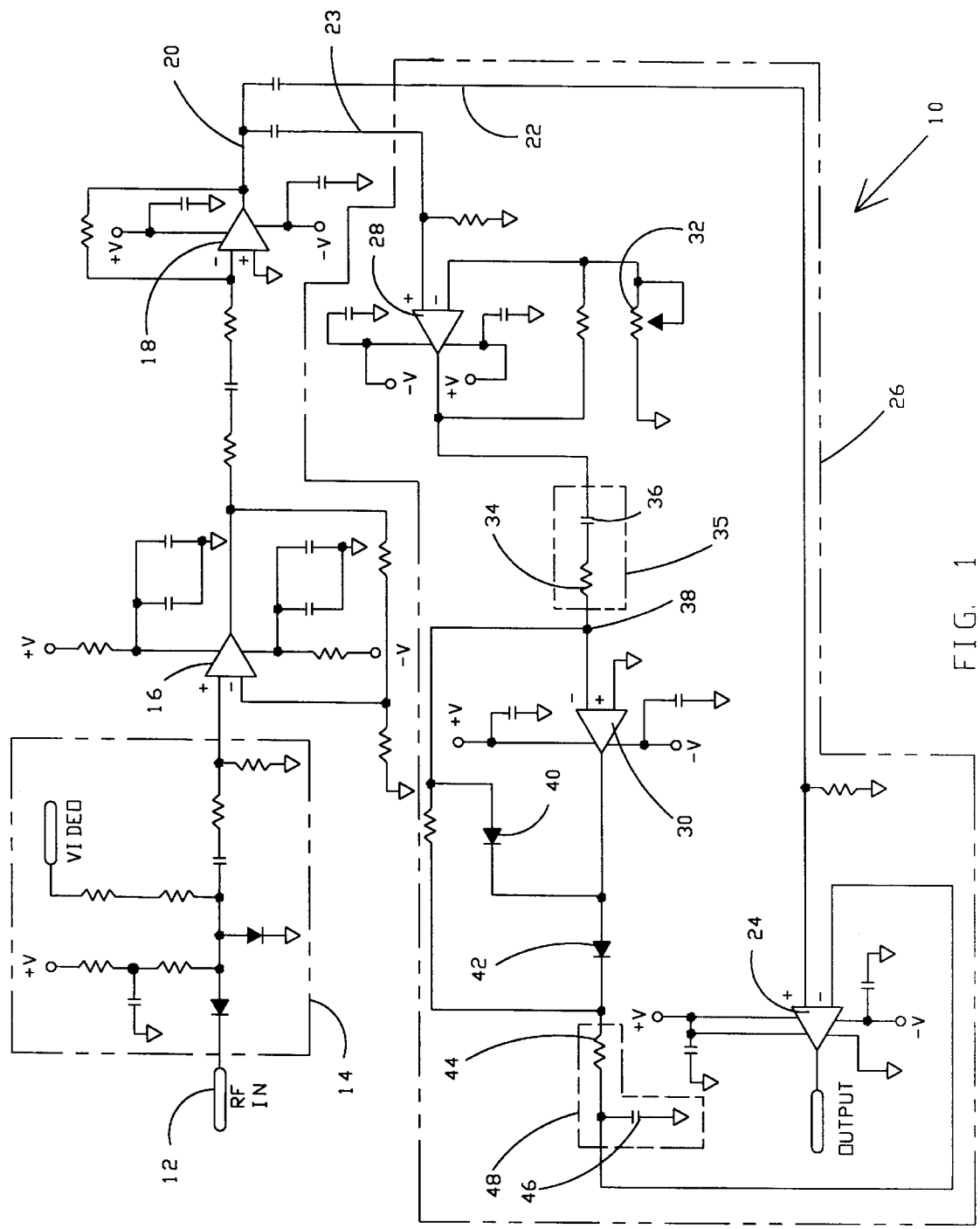
FIG. 1 is a circuit diagram of a radar receiver with a noise riding threshold control in accord with the present invention.

Referring now to FIG. 1, there is shown crystal video receiver 10, which is operable for receiving a radar signal in accord with the present invention. The radio frequency signal is applied at rf input 12 for envelope detection by Schottkey detector 14 wherein the radio frequency carrier is stripped away to produce a low level video signal and noise. The low level video signal and the noise are amplified by video amplifiers 16 and 18. The amplified video signal and noise output 20 of video amplifier 18 is split into two branches 22 and 23. Branch 22 connects to the non-inverting input of comparator 24.

Branch 23 connects to noise riding threshold control 26 and more specifically to the non-inverting input of video amplifier 28. A preferred embodiment of noise riding threshold control 26 includes two video amplifiers 28 and 30. In one presently preferred embodiment, video amplifiers 28 and 30 are current feedback amplifiers rather than voltage feedback amplifiers and may be of the type AD810. By the use of current feedback amplifiers in noise riding threshold control 26, additional high gain can be obtained without loss of bandwidth or stability. The gain of video amplifier 28 is preferably made adjustable with potentiometer 32. Therefore, amplifier 28 adjustably amplifies the signal and noise. Resistor 34 and capacitor 36 form high pass filter 35 with a low frequency cutoff in the general range preferably of about 3 MHz; The video signal and noise with frequency components below this cutoff frequency are attenuated while the video signal and noise with frequency components above this cutoff are passed on to amplifier 30. Radar signals generally have pulse repetition frequencies lower than 500 KHz so most of the radar signal components are blocked by high pass filter 35 whereas noise at frequencies between 3 MHz and the bandwidth of the video amplifiers, which may be about 15 MHz due to the high gain wide bandwidth current controlled video amplifier 28, are present at the inverting input of video amplifier 30.

Amplifier 30 inverts the signal at 38 from video amplifier 28. Diodes 40 and 42 allow only the negative portion of the inverted signal to be passed on for integration by low pass filter 48 formed of resistor 44 and capacitor 46. Low pass filter 48 may have a high frequency cut off in the range of about 1.6 Hz, or a very low frequency to produce a dc signal. The signal from low pass filter 48 is a dc level that represents an amplified average of the noise, or more specifically, the noise with frequency components above 3 MHz. This dc signal is the threshold level and will vary with the noise for automatic adjustment of the threshold. The threshold level can be calibrated for a given noise level by adjusting potentiometer 32. Potentiometer 32 may be adjusted to calibrate the noise riding threshold so that the dc threshold level at the inverting input to comparator 24 is set in the range of 3 dB above a tangential sensitivity signal at the non-inverting input of comparator 24. The threshold level will then remain at this relative level for changing noise levels. Comparator 24 produces an output with noise substantially removed due to the threshold level of operation. This output may be further processed such as for operating an L.E.D. warning signal (not shown) or for application to a microprocessor (not shown) and the like as desired.

In summary, noise riding threshold circuit or control 26 allows the noise riding threshold to maintain a set level relative to the detected noise while remaining immune to signal with duty cycles of up to 50% and pulse repetition frequencies as high as 100 KHz.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A radar receiver, comprising:
   a detector for receiving a radar signal and removing a carrier frequency signal to produce a video signal with noise;
   one or more amplifiers for amplifying said video signal with said noise to produce an amplified signal;
   a noise riding threshold control for receiving said amplified signal, said noise riding threshold control being operable for producing a dc threshold signal; and
   a comparator for receiving said amplified signal and said dc threshold signal.
2. The radar receiver of claim 1, wherein said noise riding threshold control further comprises one or more current feedback video amplifiers.
3. The radar receiver of claim 1, wherein said noise riding threshold control further comprises a first video amplifier with a gain control.
4. The radar receiver of claim 3, wherein said noise riding threshold control further comprises a second video amplifier with one or more rectifiers for producing a rectified signal.
5. The radar receiver of claim 4, wherein said noise riding threshold control further comprises a high pass filter with a low frequency cutoff greater than 500 KHz disposed between said first video amplifier and said second video amplifier.
6. The radar receiver of claim 5, wherein said noise riding threshold control further comprises a low pass filter with a high frequency cutoff less than 10 Hz for integrating said rectified signal.
7. The radar receiver of claim 1, wherein said noise riding threshold control further comprises:
   a first current feedback amplifier for receiving said amplified signal; and
   a potentiometer being associated with said first current feedback amplifier for adjusting a gain thereof.
8. A method for detecting a radar signal, comprising:
   envelope detecting said radar signal to remove a carrier signal and produce a combination signal having a video signal with a noise signal, said video signal having high frequency video signal components above 500 KHz and low frequency video signal components below 500 KHz, said noise signal having high frequency noise components above 500 KHz and low frequency noise components below 500 KHz;
   filtering said combination signal to obtain said high frequency video signal components above 500 KHz and said high frequency noise components above 500 KHz;
   rectifying said high frequency video signal components above 500 KHz and said high frequency noise components above 500 KHz to produce a rectified signal;
   integrating said rectified signal to produce a noise riding threshold signal; and
   comparing said combination signal and said noise riding threshold signal.
9. The method of claim 8, further comprising applying said combination signal to a first path and a second path, said first path being used for connecting said combination signal to a comparator, said second path being used-for connecting said combination signal to a noise riding threshold control.
10. The method of claim 9, further comprising adjustably amplifying said combination signal in said second path.
11. The method of claim 9, further comprising amplifying said combination signal in said second path with one or more amplifiers employing current feedback.
12. The method of claim 8, wherein said step of detecting further comprises applying said radar signal to a Schottkey detector.
13. The method of claim 8, further comprising adjusting said noise riding threshold signal to a predetermined level with respect to said high frequency noise components above 500 KHz.
14. A radar receiver, further comprising:
   a detector for receiving a radar signal and removing a carrier frequency signal to produce a video signal with noise;

a first current feedback amplifier for amplifying said video signal with said noise;

a high pass filter connected to an output of said first current feedback amplifier to produce a filtered signal;

a second current feedback amplifier with one or more rectifiers for amplifying and rectifying said filtered signal to produce a rectified signal;

a low pass filter for integrating said rectified signal to produce a threshold signal; and a comparator for receiving said threshold signal and said video signal with noise.

15. The radar receiver of claim 14, wherein said high pass filter has a low frequency cutoff greater than 500 KHz.

16. The radar receiver of claim 14, wherein said low pass filter has a high frequency cutoff less than 10 Hz.

17. The radar receiver of claim 14, wherein said detector comprises a Schottkey detector.

18. The radar receiver of claim 14, further comprising an adjustable resistor for controlling a gain of said first current feedback amplifier.

* * * * *